US009725809B2

(12) United States Patent
Perillon et al.

(10) Patent No.: US 9,725,809 B2
(45) Date of Patent: Aug. 8, 2017

(54) CERAMIC COATING WITH SCRATCH RESISTANCE AND THERMAL CONDUCTION PROPERTIES

(71) Applicant: SEB S.A., Ecully (FR)

(72) Inventors: Jean-Luc Perillon, Saint Paul Trois Chateaux (FR); Aurelien Dubanchet, Gresy sur Aix (FR); Laurent Caillier, Rumilly (FR)

(73) Assignee: SEB S.A., Ecully (FR)

( * ) Notice: Subject to any disclaimer, the term of this patent is extended or adjusted under 35 U.S.C. 154(b) by 760 days.

(21) Appl. No.: 14/067,033

(22) Filed: Oct. 30, 2013

(65) Prior Publication Data

US 2014/0120284 A1    May 1, 2014

(30) Foreign Application Priority Data

Oct. 31, 2012 (FR) ..................... 12 60431

(51) Int. Cl.
| | |
|---|---|
| C23C 18/12 | (2006.01) |
| A47J 36/02 | (2006.01) |
| C09D 5/00 | (2006.01) |
| C09D 5/24 | (2006.01) |
| A47J 36/06 | (2006.01) |
| C23C 2/02 | (2006.01) |
| C23C 2/04 | (2006.01) |
| B05D 1/36 | (2006.01) |
| B05D 1/02 | (2006.01) |
| C09D 5/26 | (2006.01) |
| C23C 24/08 | (2006.01) |
| A47J 36/04 | (2006.01) |

(52) U.S. Cl.
CPC ........... *C23C 18/1254* (2013.01); *A47J 36/02* (2013.01); *A47J 36/025* (2013.01); *A47J 36/04* (2013.01); *A47J 36/06* (2013.01); *B05D 1/02* (2013.01); *B05D 1/36* (2013.01); *C09D 5/00* (2013.01); *C09D 5/24* (2013.01); *C09D 5/26* (2013.01); *C23C 2/02* (2013.01); *C23C 2/04* (2013.01); *C23C 24/082* (2013.01); *Y10T 428/131* (2015.01); *Y10T 428/1317* (2015.01); *Y10T 428/1321* (2015.01); *Y10T 428/1355* (2015.01); *Y10T 428/1359* (2015.01)

(58) Field of Classification Search
CPC .......... A47J 36/02; A47J 36/025; A47J 36/04; A47J 36/06; Y10T 428/131; Y10T 428/1317; Y10T 428/1321; Y10T 428/1355; Y10T 428/1359; C09D 5/00; C09D 5/24; C09D 5/26; C23C 2/02; C23C 2/04; C23C 18/1254; B05D 1/02; B05D 1/36
See application file for complete search history.

(56) References Cited

U.S. PATENT DOCUMENTS

| 2007/0134488 | A1† | 6/2007 | Hayakawa |
| 2009/0017200 | A1 | 1/2009 | Binkle et al. |
| 2010/0242799 | A1 | 9/2010 | Kim |
| 2011/0180546 | A1† | 7/2011 | Le Bris |
| 2011/0308989 | A1 | 12/2011 | Berrux et al. |
| 2012/0018433 | A1 | 1/2012 | Le Bris et al. |

FOREIGN PATENT DOCUMENTS

| EP | 0810301 | | 3/1997 |
| EP | 1048751 | † | 11/2000 |
| EP | 1469045 | | 10/2004 |
| EP | 2141138 | | 1/2010 |
| JP | 61192771 | A | 8/1986 |
| JP | 551557 | A | 3/1993 |
| JP | 10113290 | † | 5/1998 |
| JP | 2011503320 | A | 1/2011 |
| JP | 2012513788 | A | 6/2012 |

OTHER PUBLICATIONS

Wikipedia entry entitled "Graphite", accessed Sep. 19, 2016.*
[No Author Listed], Boron nitride. Wikipedia. Mar. 22, 2016. https://en.wikipedia.org/w/index.php?title=Boron_nitride&oldid=711439633 [last accessed Mar. 22, 2016]. 12 pages.†
[No Author Listed], SR-SJ2/SK2 series of stream IH rice cookers on sale. Press Release. Jun. 1, 2010. http://news.panasonic.com/jp/press/data/jn100326-1/jn100326-1.html and/or http://news.panasonic.com/press/news/official.data/data.dir/jn100326-1/jn100326-1.html [last accessed Aug. 31, 2016] or https://web.archive.org/web/20100329134030/http://panasonic.co.jp/corp/news/official.data/data.dir/jn100326-1/jn100326-1.html [last accessed Feb. 24, 2016]. 17 pages.†
[No Author Listed], Panasonic SR-SK102: Far-red Large firepower Kamadokama equipped with a steam IH rice cooker (1210W). Specifications and Features. Mar. 26, 201 http://kakaku.com/item/K0000099285/spec/#tab [last accessed Aug. 30, 2016] and/or http://news.panasonic.com/jp/press/data/jn100326-1/jn100326-1.html [last accessed Aug. 31, 2016]. 11 pages.†
[No Author Listed], 99.5% Alumina Material Properties. Accuratus Ceramic Corporation. http://www.accuratus.com/pdf/995aluminaprops.pdf [last accessed Aug. 19, 2016]. 1 page.†
[No Author Listed], Diamond. In: The Merck Index. 1996. Budavari et al., Eds. p. 506.†

* cited by examiner
† cited by third party

*Primary Examiner* — Walter B Aughenbaugh
(74) *Attorney, Agent, or Firm* — The Webb Law Firm

(57) ABSTRACT

Provided is a ceramic coating intended to be applied on a metal support and having the form of at least a continuous film having a thickness between 2 and 100 µm, this coating comprising a matrix including at least a metal polyalkoxide and wherein are dispersed particles whereof the diameter ranges between 0.01 and 50 µm, said particles being from a material having a thermal conductivity equal to or higher than 10 W·m$^{-1}$·K$^{-1}$ and a bulk density of at the most 3.9 g/cm$^3$. Also provided is an article, for example culinary, comprising such a coating and its method of manufacture.

24 Claims, No Drawings

CERAMIC COATING WITH SCRATCH RESISTANCE AND THERMAL CONDUCTION PROPERTIES

CROSS-REFERENCE TO RELATED APPLICATION

This application claims priority to French Patent Application No. 1260431 filed on Oct. 31, 2012 in the French Intellectual Property Office, the disclosure of which is hereby incorporated by reference in its entirety.

FIELD OF THE INVENTION

The present invention generally relates to a ceramic coating obtained by a sol-gel process making the production of vitreous material without resorting to fusion possible, said ceramic coating being intended to be applied on a metal support.

The invention also relates to a method of producing said coating as well as to an article comprising at least a layer of such a coating, said article able to be a culinary article, an iron soleplate, hair smoothing iron plates or even a lid of a household appliance.

BACKGROUND OF THE INVENTION

By ceramic coating, is meant within the meaning of the present invention, a synthesized coating by sol-gel process from a liquid phase precursor based solution, which converts into a solid through a set of chemical reactions (hydrolysis and condensation) at low temperature. The, thus obtained coating can either be organo-mineral or entirely mineral.

By organo-mineral coating is meant within the meaning of the present invention, a coating whereof the network is substantially inorganic, but comprises organic groups, particularly due to the nature of the precursors used and the curing temperature of the coating.

By entirely mineral coating is meant, within the meaning of the present invention, a coating consisting of a completely inorganic material, free from any organic group. Such a coating can also be obtained by sol-gel process with a curing temperature of at least 400° C., or from tetraethoxysilane (TEOS) type precursors with a curing temperature which can be lower than 400° C.

These ceramic coatings are currently witnessing an important development in the field of culinary articles, and particularly by way of coatings covering the inner or outer surface of culinary articles. Furthermore, they have the advantage of making it possible to obtain particularly temperature resistant colored coatings and having easy cleaning properties.

Such coatings are commonly obtained by combining silicon based metal alkoxides such as silanes, or aluminum based ones such as aluminates, and can be applied on metal substrates, such as aluminum, cast aluminum or stainless steel.

However, these sol-gel coatings have limited mechanical resistance properties on metal support, and/or do not permit an optimal thermal conduction, owing to their thermally insulating character. In fact, in the case for example of culinary articles, part of the energy provided to said article is dissipated in the insulating coating instead of being directly transmitted to the food to be cooked. Moreover, with a sol-gel coating which does not conduct or badly conducts heat, a local formation of hot points, unfavorable to the cooking quality, can be observed at the area in contact with the heating member.

Nevertheless, it is essential to be able to have thermally resistant coatings at more than 200° C., that conduct heat in a homogenous and effective manner in their final usage, and which in addition, are mechanically resistant to the usage aggressions (scratches, abrasion . . . ).

In order to resolve such a problem, the skilled person would normally consider the use of standard metal fillers of micrometric size. However, these fillers have a high density, making their suspension difficult and generating a risk of rapid decantation in a formulation containing them.

The applicant has thus, sought to resolve this density problem by incorporating fillers having a low bulk density and a high thermal conductivity. Diamond and cubic boron nitride particles fulfill these two constraints and their use in ceramic coatings obtained by sol-gel process is known by the skilled person.

Thus, U.S. Pat. No. 6,939,908 teaches the use, in transparent ceramic coatings obtained by sol-gel process from a precursor such as an alkoxysilane, of abrasion-resistant particles of aggregate type with a diameter ranging between 0.05 µm and 20 µm for improving the coating deformation resistance, as well as the use of ceramic nanoparticles, of diameter less than 0.1 µm for increasing the transparency of the coating. It consists of transparent coatings for plastic substrates substantially intended for ophthalmic type, motor vehicle glass or airplane cockpit applications. Such coatings can also be applied on metal substrates in order to improve their hardness and corrosion resistant properties.

Furthermore, patent application US 2011/0127461 describes a thermo-conductive composition obtained by sol-gel process, which consists in a polysiloxane matrix wherein inorganic particles are dispersed, such as boron nitride or diamond particles, of dimension ranging between 0.003 and 50 µm, the particles and matrix being chemically bonded. Due to their high thermal conductivity, the diamond or CBN particles favor the transmission of heat inside the rather thermally insulating polysiloxane matrix.

The sol-gel coatings have a thickness ranging between 200 and 500 µm. These consist of very thick coatings intended to be used in the field of electronic power as material for sealing and protecting semi-conductive members. The mechanical resistance properties are not sought for these type of coatings.

In particular, the high content in particles necessary for ensuring the thermal conduction under a thick layer of coating generates a high risk of chipping, which is acceptable for a hardly mechanically solicited electronic application, but is unacceptable for a culinary application that is subjected to constant mechanical aggressions (impacts, abrasion, repeated shocks).

However, the sol-gel coatings taught by these documents do not make it possible to resolve the technical problem of the present invention, which consists in jointly and efficiently improving the mechanical resistance of a sol-gel coating of low thickness (particularly less than 100 nm) and its thermal homogeneity during usage.

SUMMARY OF THE INVENTION

In order to resolve this problem, the applicant has developed by sol-gel process a ceramic coating in which there are particles of low bulk density (less than 3.9 g/cm$^3$) while having good thermal conductivity properties.

DESCRIPTION OF THE INVENTION

The present invention hence relates to a ceramic coating, intended to be applied on a metal support and being in the form of at least a continuous film having a thickness ranging between 2 and 100 µm, said coating comprising a matrix including at least a metal polyalkoxide and wherein are dispersed particles whereof the diameter ranges between 0.01 and 50 µm, these particles being from a material having a thermal conductivity equal to or higher than 10 W·m$^{-1}$·K$^{-1}$ and a bulk density of at the most 3.9 g/cm$^3$. Advantageously, the material constituting the particles has a hardness Mohs equal to or higher than 9, to provide a surplus of hardness to the matrix of the coating based on metal polyalkoxylate according to the invention. Although, high degrees of hardness can be obtained for metal polyalkoxylate based sol-gel coatings thanks to a judicious choice of metal alkoxide (by using for example aluminized derivatives instead of silicon-containing ones), the maximum hardness possible cannot be attained as the reaction process by sol-gel process preferentially leads to amorphous compounds, which are intrinsically of lesser hardness than crystalline compounds. The obtention of crystalline compounds could only be acquired if a hardening process had been carried out at very high temperature, which would be incompatible with the usage of certain metal supports and the environmental and productivity constraints.

The particles, which can or not be of the same chemical species, can be of identical or different sizes. Thus, it is made possible to have particles of different chemical nature and of different sizes.

Advantageously, the diameter of the particles ranges between 0.05 and 20 µm, preferably between 0.1 and 5 µm and better still between 0.5 and 3 µm.

Advantageously, the particles dispersed in the matrix of the ceramic coating according to the invention may be selected from among diamond particles; cubic boron nitride or CBN particles; particles of diamond like carbon type or DLC; silicon carbide particles, boron carbide particles, aluminum nitride particles, silicon nitride particles and their combinations.

By "diamond like carbon", abbreviated DLC, is meant, according to the present invention, an amorphous structure with tetrahedral bonds of the same type as the diamond structure.

These dispersed particles are advantageously present in the coating according to the invention at the rate of 0.5 to 8%, and preferably at the rate of 2 to 4% in weight of the coating.

Advantageously, the matrix of the ceramic coating according to the invention is formed from a metal polyalkoxylate selected from among polyalkoxysilanes, aluminates, titanates, zirconates, vanadates, borates and their combinations.

The metal polyalkoxylate of the matrix of the ceramic coating according to the invention may further comprise at least a non-functionalized alkyl group. This alkyl group may be linear or branched and selected from among alkyl groups in $C_1$, $C_2$, $C_3$ or $C_4$, that is to say, the methyl, ethyl and alkyl groups comprising 3 or 4 carbon atoms. The presence of alkyl groups proves to be particularly advantageous for improving the hydrophobicity of the coating according to the invention, without hindering however the formation of the inorganic network.

Apart from the dispersed particles having a good thermal conductivity and a low bulk density, the matrix of the ceramic coating according to the invention may further comprise at least a reactive or unreactive silicone oil (or a mixture of silicone oils), to improve the hydrophobic character of the coating surface.

By way of reactive silicon oils that are used within the framework of the present invention, may particularly cited chlorinated oils, amino oils, (meth)acrylated oils, hydroxylated oils, and anhydride, hydride or vinyl-terminated oils. By way of examples of reactive silicon oils available on the market, one may particularly cite hydroxylated oil commercialized by the Wacker company under brand name OEL CT101M or vinylated oil commercialized by company BRB under brand name vinyl fluid 100.

By way of non reactive silicone oils that can be used within the framework of the present invention, one may particularly cite phenyl silicones, methyl phenyl silicones and methyl silicones.

If the coating according to the invention is intended for a culinary application, particularly to be in contact with food, it is preferable to opt for a silicone oil selected from among methyl phenyl silicones and methyl-silicone oils.

By way of examples of methyl phenyl silicones, one may particularly cite the oils commercialized by the WACKER company under trade name WACKER SILICONOL AP150 and by the DOW CORNING company under brand name DOW CORNING 550 fluid as well as the oils commercialized by the WACKER AROO company.

By way of examples of methyl silicone oils, may particularly be cited the oil commercialized by the RHODIA company under brand name RHODIA 47 V 100, the oil of the company DOW CORNING 200 fluid, or even oil from company TEGO ZV 9207, which are methyl silicone oils.

Silicone oil may advantageously have a dynamic viscosity at 20° C. ranging between 0.012 and 0.5 Pa·s.

Advantageously, silicone oil represents 0.01 to 2% in weight of said coating, advantageously from 0.3 to 2% in weight of the total weight of the coating.

The matrix of the ceramic coating according to the invention may further comprise, at least a structuring filler and/or at least a pigment giving color to the coating.

By structuring filler, is meant, within the meaning of the present invention, a filler making it possible to improve the aptitude of the coating to form high thickness layers (particularly higher than 2 µm).

By way of structuring fillers usable in the coating according to the invention, can be particularly cited:
  (i) metal oxides such as alumina zinc oxide, copper oxide, iron oxide,
  (ii) silica,
  (iii) zirconia,
  (iv) mica,
  (v) clays such as montmorillonite, sepiolite, gypsite, kaolinite and laponite,
  (vi) zinc oxide,
  (vii) quartz, and
  (viii) zirconium phosphate,
  these fillers being in the form of a powder or colloidal suspensions.

It will preferably be used by way of fillers improving the aptitude of the coating according to the invention for forming high thickness layers, powders or colloidal suspensions of alumina and silica.

By way of pigments in accordance with the invention, may be particularly cited coated or uncoated mica, titanium dioxide, mixed oxides of copper-chromium-manganese, copper-chromium, chromium-antimony-titanium, tin-zinc-titanium, spinel, aluminosilicates, iron oxides, carbon black, perylene red, flakes, interference pigments, thermochromic pigments, magnetic or magnetizable pigments, cobalt salts, nickel titanate and their combinations.

Preferably, the film has a thickness ranging between 5 and 70 μm such that the thus formed skin is continuous, coherent and sufficient for absorbing the roughness of the support.

Unless otherwise specified, all percentages indicated above, pertaining to the components of the coating are expressed in mass percentage and express the percentage of the component with respect to the total weight of the coating in dry state.

The invention also relates to an article comprising at least a layer of ceramic coating according to the invention (such as defined previously).

Advantageously, the article according to the invention may comprise at least two layers of ceramic coating according to the invention, the total thickness of said layers ranging between 10 and 120 μm.

The article according to the invention may be a culinary article, or an iron soleplate, or hair smoothing iron plates, or even a lid of a household appliance.

If it consists of a culinary article, the latter will typically comprise a metal support having an inner side able to receive food and an outer side intended to be arranged towards the source of heat, said coating being applied on one at least of the inner and outer sides.

By way of metal supports usable within the framework of the present invention for culinary articles, may be particularly cited supports having:
- a monolayer structure in anodized aluminum or not, or in polished, brushed or microbeaded, sanded or chemically treated aluminum, or in cast aluminum, or polished stainless steel, brushed or microbeaded, or cast iron, or in beaten or polished copper; or
- a multilayer structure, in part or in totality, comprising from the outside to the inside the following layers stainless steel/aluminum/stainless steel or even stainless steel/aluminum/copper/aluminum/stainless steel, or even a cast aluminum bowl, of aluminum or aluminum alloys doubled with an outside bottom in stainless steel.

Finally, the invention also relates to a method for manufacturing a ceramic coating on at least a surface of metal support, said method comprising the following steps:
i) possibly, a surface treatment of said surface of metal support in order to improve the adhesion of the sol-gel layer applied at step iv);
ii) preparation of a sol-gel composition with:
  at least a sol-gel precursor selected from among the metal alkoxydes,
  particles having a diameter ranging between 0.01 and 50 micrometers and being in a material having a thermal conductivity equal to or higher than 10 $W \cdot m^{-1} \cdot K^{-1}$ and a bulk density of at the most 3.9 $g/cm^3$, and preferably a hardness Mohsl equal to or higher than 9, and
  possibly (a) at least a silicone oil, reactive or not, and/or (b) at least a filler for improving the mechanical properties of the shaped coating, preferably alumina or silica, and/or (c) at least a pigment,
iii) hydrolysis of said sol-gel precursor by introducing water and a catalyst, acid or base, followed by a partial condensation reaction for obtaining a sol-gel composition SG;
iv) application on said surface of at least a layer of said sol-gel composition SG obtained following step iii);
v) possibly drying of said layer at a temperature ranging between 40 and 90° C.; and
vi) curing said article coated following step iv) or v) at a temperature ranging between 150° C. and 400° C.

The metal support on which the ceramic coating is applied according to the invention is such as defined previously.

In order to improve the adherence of the sol-gel layer on a metal support, particularly aluminum, or stainless steel or cast iron, the skilled person can advantageously carry out a surface treatment (i) of the surface of the metal support intended to receive the sol-gel layer. Such a surface treatment can for example consist in a chemical treatment (for example by chemical etching) or a mechanical treatment (for example by brushing or sanding), or even a combination of these treatments. This surface treatment can be advantageously followed with a possible degreasing and/or dusting.

As regards step ii) of preparing a sol-gel composition, the latter mainly comprises particles of a material having specific physicochemical properties (thermal conductivity equal to or higher than 10 $W \cdot m^{-1} \cdot K^{-1}$ and bulk density of at the most 3.9 $g/cm^3$), which are such as defined previously, and at least a sol-gel precursor selected from among the metal alkoxydes.

It is preferably used, by way of sol-gel precursor, a metal alkoxyde selected from the group constituted of:
  the precursors having the general formula $M_1(OR_1)_n$,
  the precursors having the general formula $M_2(OR_2)_{(n-1)} R_2'$, and
  the precursors having the general formula $M_3(OR_3)_{(n-2)} R_3'_2$, with:
    $R_1$, $R_2$, $R_3$ or $R_3'$ designating an alkyl group in C1-C4,
    $R_2'$ designating an alkyl group in C1-C4, or phenyl, n being an integer corresponding to the maximum valence of metals $M_1$, $M_2$ or $M_3$,
    $M_1$, $M_2$ or $M_3$, designating a metal selected from among Si, B, Zr, Ti, Al, V.

The metal alkoxyde can hence advantageously be selected, for example, from among the alkoxysilanes, aluminates, titanates, zirconates, vanadates, borates and their combinations.

It is preferably used an alkoxysilane by way of sol-gel precursor.

By way of alkoxysilanes in accordance with the invention, may be particularly cited methyltrimethoxysilane (MTMS), tetraethoxysilane (TEOS), methyltriethoxysilane (MTES), dimethyldimethoxysilane, and their combinations.

Preferably, MTES and/or TEOS alkoxysilanes will be used as they have the advantage of not containing methoxy groups. In fact, the hydrolysis of methoxy leads to the formation of methanol in the sol-gel formulation, which, given its toxic classification requires taking extra caution during the application. In contrast, the hydrolysis of ethoxy groups only generates ethanol which has a more favorable classification and hence less stringent usage requirements for the sol-gel coating.

The sol-gel composition prepared at step (i) may further advantageously comprise at least a silicone oil, reactive or not, and/or at least a filler for improving the mechanical properties of the coating to be formed, and/or at least a pigment, silicone oil, the filler for improving the mechanical properties of the coating to be formed, and the pigment are also such as previously defined.

As regards step iii) of hydrolyzing the sol-gel precursor, by way of catalyst, is advantageously used an acid selected from among acetic acid, formic acid and hydrochloric acid.

As regards step iv) of applying the sol-gel composition on the surface of the support, the latter can advantageously be carried out by spraying. The layer of sol-gel composition SG applied at step iv) can have a thickness in the wet state of between 4 and 200 μm (corresponding to a thickness in the dry state between 2 and 100 μm), advantageously between 10 and 140 μm (corresponding to a thickness in the dry state between 5 and 70 μm), and/or step (iv) can be repeated until obtaining a succession of layers whereof the total thickness in the wet state is of 20 to 240 μm (corresponding to a thickness in the dry state between 10 to 120 μm).

The step iv) of applying the sol-gel composition may be possibly followed by a step of drying at a temperature ranging between 40° C. and 90° C., preceding the final curing vi) of the article.

Furthermore, the method according to the invention may further comprise a step of applying a continuous or discontinuous layer of decoration, between the step iv) of applying the sol-gel composition (or if need be of drying v)) and the step vi) of curing the article, this application of a layer of decoration able to be itself followed (or not) with a step of drying at a temperature less than 90° C. preceding the final curing vi) of the article.

Unless otherwise specified, all the percentages of the components of the present application are expressed in mass percentages. The invention is illustrated in further detail in the following examples.

EXAMPLES

Example 1: Preparing a Diamond Powder Based Ceramic Coating According to the Invention The ceramic coating is prepared in the form of a bi-component of compositions A and B.

Composition A makes it possible to provide pigmentation, additives for improving the anti-adherence qualities of the coating (easy cleaning) as well as the fillers making it possible to improve the adherence of the coating and rely on its final aspect. This composition A contains diamond powder.

Composition B comprises reactive silanes which make it possible to form the coating matrix.

The working procedure is the following:

1/ composition A is prepared by successively introducing (in weight with respect to the total weight of said composition A):
- 40% of colloidal silica (that is to say Klebosol 40V12);
- 15% of demineralized water,
- 10% of isopropanol (intended to improve the compatibility of compositions A and B);
- 2% of non reactive silicone oil (that is to say, Rhodorsil 47V50) making it possible to improve the anti-adherence qualities of the coating;
- 30% of black pigment (i.e. FA1220); and
- 3% of diamond powder of mean diameter of 12 micrometers, with respect to the weight of the dry film.

2/ composition B is prepared by mixing methyltriethoxysilane with the acetic acid in order to limit the reactivity of the silane by creation of a chelate. The acid content is of 5% in weight with respect to the total weight of composition B. A high content is advantageous if it is required to increase the life of said mixture.

These two compositions A and B can keep for more than 6 months in this separate form.

3/ Thus, in a mixer, compositions A and B are united with a ratio A/B of 50/50 in weight, to create an intimate mixture and make the hydrolysis reaction possible. The stirring operation may be rapid in itself, however it is necessary to leave this mixture to mature for at least 24 hours before applying it as coating.

The pot life of the mixture is of at least 72 hours.

4/ The mixture is filtered on a stainless steel grid of 40 μm.

5/ The aluminum support, in the form of a 26 diameter pan, is treated mechanically by a sanding operation and is then degreased.

6/ The mixture is applied using a pneumatic gun on one of the two sides of said support obtained at step 5, in a layer of coating with a thickness of 30±3 μm.

Greater thicknesses up to 100 or 120 μm are possible by multiplying the number of layers, each layer being dried before applying the following one.

7/ The thus, coated piece is soft baked during 30 minutes at a temperature of 220° C.

Example 2: Preparing a Silicon Carbide SiC Based Ceramic Coating According to the Invention The ceramic coating is prepared in the form of a bi-component of compositions A and B.

Composition A makes it possible to provide pigmentation, additives for improving anti-adherence qualities of the coating (easy cleaning) as well as the fillers making it possible to improve the adherence of the coating and to rely on its final aspect. Composition A comprises SiC particles. Composition B comprises reactive silanes making it possible to form the coating matrix.

The working procedure is the following:

1/ Composition A is prepared by successively introducing (in weight with respect to the total weight of said composition A):
- 40% of colloidal silica (that is to say Klebosol 40V12);
- 15% of demineralized water,
- 10% of isopropanol (intended to improve the compatibility of compositions A and B);
- 2% of non reactive silicone oil (that is to say, Rhodorsil 47V50) making it possible to improve the coating anti-adherence qualities;
- 27% of black pigment (i.e. FA1220); and
- 6% of silicon carbide of mean diameter of 5 micrometers, with respect to the weight of the dry film.

2/ Composition B is prepared by mixing methyltriethoxysilane with the acetic acid, in order to limit the reactivity of the silane by creation of a chelate.

The acid content is of 5% in weight with respect to the total weight of composition B. A high content is advantageous if it is required to increase the life of said mixture.

These two compositions A and B can keep for more than 6 months in this separate form.

3/ Thus, in a mixer, compositions A and B are united with a ratio A/B of 50/50 in weight, to create an intimate mixture and make the hydrolysis reaction possible. The stirring operation may be rapid in itself, however it is necessary to leave this mixture to mature for at least 24 hours before applying it as coating.

The pot life of the mixture is of at least 72 hours.

4/ The mixture is filtered on a stainless steel grid of 40 μm.

5/ The aluminum support, in the form of a 26 diameter pan, is treated mechanically by a sanding operation and is then degreased.

6/ The mixture is applied using a pneumatic gun on one of the two sides of said support obtained at step 5, in a layer of coating with a thickness of 30±3 μm.

Greater thicknesses up to 100 or 120 μm are possible by multiplying the number of layers, each layer being dried before applying the following one.

7/ The thus, coated piece is soft baked during 30 minutes at a temperature of 220° C.

Example 3: Preparing a Ceramic Coating According to the Invention Comprising Cubic Boron Nitride (CBN) Particles The ceramic coating is prepared in the form of a bi-component of compositions A and B.

Composition A makes it possible to provide pigmentation, additives for improving anti-adherence qualities of the coating (easy cleaning) as well as the fillers make it possible to improve the adherence of the coating and to rely on its final aspect. Composition A comprises CBN particles. Composition B comprises reactive silanes making it possible to form the coating matrix.

The working procedure is the following:

1/ Composition A is prepared by successively introducing (in weight with respect to the total weight of said composition A):
- 40% of colloidal silica (that is to say Klebosol 40V12);
- 15% of demineralized water,
- 10% of isopropanol (intended to improve the compatibility of compositions A and B);
- 2% of non reactive silicone oil (that is to say, Rhodorsil 47V50) making it possible to improve the coating anti-adherence qualities;
- 27% of black pigment (i.e. FA1220); and
- 6% of cubic boron nitride of mean diameter of 2 micrometers, with respect to the weight of the dry film.

2/ Composition B is prepared by mixing methyltriethoxysilane with the acetic acid, in order to limit the reactivity of the silane by creation of a chelate.

The acid content is of 5% in weight with respect to the total weight of composition B. A high content is advantageous if it is required to increase the life of said mixture.

These two compositions A and B can keep for more than 6 months in this separate form.

3/ Thus, in a mixer, compositions A and B are united with a ratio A/B of 50/50 in weight, to create an intimate mixture and make the hydrolysis reaction possible. The stirring operation may be rapid in itself, however it is necessary to leave this mixture to mature for at least 24 hours before applying it as coating.

The pot life of the mixture is of at least 72 hours.

4/ The mixture is filtered on a stainless steel grid of 40 μm.

5/ The aluminum support, in the form of a 26 diameter pan, is treated mechanically by a sanding operation and is then degreased.

6/ The mixture is applied using a pneumatic gun on one of the two sides of said support obtained at step 5, in a layer of coating with a thickness of 30±3 μm.

Greater thicknesses up to 100 or 120 μm are possible by multiplying the number of layers, each layer being dried before applying the following one.

7/ The thus, coated piece is soft baked during 30 minutes at a temperature of 220° C.

Comparative Example 4: Preparing a Ceramic Coating That is Not in Compliance With the Invention 1/ Composition A is prepared by successively introducing (in weight with respect to the total weight of said composition A):
- 40% of colloidal silica (that is to say Klebosol 40V12);
- 15% of demineralized water,
- 10% of isopropanol;
- 2% of non reactive silicone oil (that is to say, Rhodorsil 47V50); and
- 33% of black pigment (i.e. FA1220).

2/ Composition B is prepared separately by mixing the methyltriethoxysilane with 5% in weight of acetic acid with respect to the total weight of composition B.

3/ Thus, in a mixer, compositions A and B are united with a ratio A/B of 50/50 in weight, this mixture is left to mature for at least 24 hours before applying it as coating.

4/ The mixture is filtered on a stainless steel grid of 40 micrometers.

5/ The aluminum support, in the form of a 26 diameter pan, is treated mechanically by a sanding operation and is then degreased.

6/ The mixture is applied using a pneumatic gun on one of the two sides of said support obtained at step 5, in a layer of coating with a thickness of 30±3 μm.

7/The thus, coated piece is soft baked during 30 minutes at a temperature of 220° C.

Tests

Evaluation of Scratch Resistance

Description of the Test:

Using a diamond tip of 50 micrometers in diameter, a progressive load is applied on the coating of example 1 and comparative example 2, by increasing the force applied from 0 to 4 Newtons. Then the trace of the scratch is observed by optical microscope. The retained delamination value for the coating corresponds to the force for which a clean break from the film to the metal is observed. The load increase rate parameters and travelling speed of the tip are kept constant for all tests. The results of the scratch resistance tests are presented in table 1 below for each of examples 1 to 4:

TABLE 1

| Examples | Mean delamination value |
| --- | --- |
| 1 (diamond powder according to the invention) | 3.9 N |
| 2 (silicon carbide powder according to the invention) | 3.8 N |
| 3 (cubic boron nitride powder according to the invention) | 3.9 N |
| 4 (comparative example not in compliance with the invention) | 3.2 N |

The comparison of each of examples 1 to 3 with example 4 show that, thanks to the hardness of these fillers, a gain of 15 to 20% is observed in the results of the scratch resistance test.

Evaluation of the Thermal Conduction within the Coatings

Description of the Test:

The difference in temperature is measured between the hottest point and the coldest point of a 26 cm diameter pan on a gas burner using a thermal camera when the article reaches a temperature close to its operating temperature, that is to say at 180° C., in the support center. Results of the evaluation tests of thermal conduction are presented in table 2 below for each of examples 1 to 4:

TABLE 2

| Examples | Difference between the hottest and coldest point (26 cm pan, center at 180° C.) |
|---|---|
| 1 | 9° C. |
| 2 | 11° C. |
| 3 | 9° C. |
| 4 | 20° C. |

The comparison of each of examples 1 to 3 with the example 4 shows that a culinary application with a noticeably improved coating is obtained without "hot points" on the article with a good thermal flow. As a result, the energy efficiency is optimized and the risk of food degradation reduced.

The invention claimed is:

1. A ceramic coating, intended to be applied on a metal support and being in the form of a continuous film having a thickness between 2 and 100 µm, said coating comprising a matrix including at least a metal polyalkoxide and wherein are dispersed particles whereof the diameter ranges between 0.01 and 50 µm, said particles being from a material having a thermal conductivity equal to or higher than $10 \text{ W} \cdot \text{m}^{-1} \cdot \text{K}^{-1}$ and a bulk density of at the most 3.9 g/cm$^3$, wherein the matrix further comprises at least a reactive silicone oil selected from among chlorinated oils, amino oils, (meth)acrylated oils, hydroxylated oils, and anhydride, hydride vinyl-terminated oils.

2. The coating according to claim 1, wherein said particles have a hardness Mohs equal to or higher than 9.

3. The coating according to claim 1, wherein the metal polyalkoxylate is selected from among the polyalkoxysilanes, aluminates, titanates, zirconates, vanadates, borates and their combinations, said metal polyalkoxylate further comprises at least a non-functionalized alkyl group.

4. The coating according to claim 1, wherein the continuous film has a thickness ranging between 5 and 70 µm.

5. The coating according to claim 1, wherein the diameter of said particles ranges between 0.05 and 20 µm.

6. The coating according to claim 1, wherein the particles dispersed in the matrix are selected from among diamond particles, cubic boron nitride particles, diamond like carbon particles, silicon carbide particles, boron carbide particles, aluminum nitride particles, silicon nitride particles and their combinations.

7. The coating according to claim 1, wherein the dispersed particles represent 0.5 to 8% in weight of said coating.

8. The coating according to claim 1, wherein the silicone oil represents 0.01 to 2% in weight of said coating.

9. The coating according to claim 1, wherein the silicone oil has a dynamic viscosity at 20° C. of 0.02 to 0.05 Pa·s.

10. The coating according to claim 1, wherein the matrix further comprises at least a structuring filler and/or at least a pigment.

11. The coating according to claim 10, wherein the pigment is selected from among coated or uncoated mica, titanium dioxide, mixed oxides of copper-chromium-manganese, copper-chromium, chromium-antimony-titanium, tin-zinc-titanium, spinels, aluminosilicates, iron oxides, carbon black, perylene red, flakes, interference pigments, thermochromic pigments, magnetic or magnetizable pigments, cobalt salts, nickel titanate and their combinations.

12. The coating according to claim 10, wherein the structuring filler is selected from among:
   (i) metal oxides,
   (ii) silica,
   (iii) zirconia,
   (iv) mica,
   (v) clays,
   (vi) zinc oxide,
   (vii) quartz, and
   (viii) zirconium phosphate,
   these fillers being in the form of a powder or colloidal suspensions.

13. The coating according to claim 12, wherein the structuring filler is a powder of alumina or a colloidal suspension of alumina or a powder of silica or colloidal suspension of silica.

14. An article comprising at least a layer of coating according to claim 1.

15. The article according to claim 14, comprising at least two layers of coating, wherein the total thickness of said layers ranging between 10 and 120 µm.

16. The article according to claim 14, which is a culinary article, or an iron soleplate, or hair smoothing iron plates or a lid of a household appliance.

17. The article according to claim 16, which is a culinary article comprising a metal support having an inner side able to receive food and an outer side intended to be arranged towards the source of heat, and wherein said coating is applied on one at least of said inner and outer sides.

18. The article according to claim 14, wherein the support is:
   a monolayer structure being of anodized aluminum, non anodized aluminum, polished aluminum, brushed aluminum, microbeaded aluminum, sanded aluminum, chemically treated aluminum, cast aluminum, polished stainless steel, brushed stainless steel, microbeaded stainless steel, cast iron, beaten copper, or polished copper; or
   a multilayer structure, in part or in totality, comprising from the outside to the inside the following layers stainless steel/aluminum/stainless steel, or stainless steel/aluminum/copper/aluminum/stainless steel, or a cast aluminum bowl, of aluminum or aluminum alloys doubled with an outside bottom being of stainless steel.

19. A method for manufacturing the coating according to claim 1 on at least a surface of a metal article, said method comprising the following steps:
   i) optionally, a surface treatment of said surface in order to improve the adhesion of the sol-gel layer applied at step iv);
   ii) preparation of a sol-gel composition with:
      at least a sol-gel precursor selected from among the metal alkoxides,
      at least particles having a diameter ranging between 0.01 and 50 µm and being made of a material having a thermal conductivity equal to or higher than 10 $\text{W} \cdot \text{m}^{-1} \cdot \text{K}^{-1}$ and a bulk density of at the most 3.9 g/cm$^3$, and
      (a) at least a reactive silicone oil selected from among chlorinated oils, amino oils, (meth)acrylated oils, hydroxylated oils, and anhydride, hydride vinyl-terminated oils and optionally (b) at least a structuring filler and/or optionally (c) at least a pigment,
   iii) hydrolysis of said sol-gel precursor by introducing water and a catalyst, acid or base, followed by a partial condensation reaction for obtaining a sol-gel composition SG;
   iv) application on said surface of at least a layer of said sol-gel composition SG obtained following step iii);
   v) optionally drying of said layer at a temperature ranging between 40 and 90° C.; and vi) curing said article coated following step iv) or v) at a temperature ranging between 150° C. and 400° C.

20. The method according to claim 19, wherein said catalyst is an acid selected from among acetic acid, formic acid and hydrochloric acid.

21. The method according to claim 19, wherein the filler is a powder or a colloidal suspension of alumina or silica.

22. The method according to claim 19, wherein the application iv) of at least a layer of sol-gel composition SG resulting from step (iii) on a metal article is carried out by spraying after an optional degreasing and/or dusting of said metal article.

23. The method according to claim 19, wherein the layer of sol-gel composition SG applied at step iv) has a thickness in the wet state of between 4 and 200 µm, and/or wherein step (iv) is repeated until obtention of a succession of layers whereof the total thickness in the wet state is of 20 to 240 µm.

24. The method according to claim 19, which further comprises a step of applying a continuous or discontinuous layer of decoration, between the step iv) of applying the sol-gel composition, or if need be, of drying v) and the step vi) of curing the article, this application of a layer of decoration can be followed with a step of drying at a temperature less than 90° C. preceding the final curing vi) of the article.

* * * * *